United States Patent [19]

Wuthrich

[11] Patent Number: 4,631,861
[45] Date of Patent: Dec. 30, 1986

[54] COMBINATION PLANT POT AND TRELLIS

[76] Inventor: David L. Wuthrich, 696 Crestview Dr., Twin Falls, Id. 83301

[21] Appl. No.: 748,213

[22] Filed: Jun. 24, 1985

[51] Int. Cl.⁴ ............................................. A01G 9/12
[52] U.S. Cl. ...................................................... 47/70
[58] Field of Search .................. 47/66, 70, 45, 46, 47, 47/44, 41.11, 41.12, 67; 24/618, 614, 615, 11 M, 11 S; 242/318

[56] References Cited

U.S. PATENT DOCUMENTS

| | | | |
|---|---|---|---|
| 425,745 | 4/1890 | Brown | 47/47 |
| 1,951,642 | 3/1934 | Augustin et al. | 47/66 |
| 3,704,545 | 12/1972 | Van Reisen | 47/84 |
| 3,987,584 | 10/1976 | Yellin | 47/66 |
| 4,440,371 | 3/1984 | Wijsman | 47/67 |

FOREIGN PATENT DOCUMENTS 942358  4/1956  Fed. Rep. of Germany .......... 47/47

Primary Examiner—Robert A. Hafer
Assistant Examiner—Bradley M. Lewis
Attorney, Agent, or Firm—K. S. Cornaby

[57] ABSTRACT

A combination portable plant pot and trellis has a pot for growing plants, flowers, vines and the like and a preferably circumferential trellis extending above the pot and detachably attached thereto. The preferred attachment means have downwardly extending extensions on support posts of the trellis, and these extensions have a lip to engage ledges along the side of the pot and are reachable through apertures in the pot rim. This secures the trellis to the pot and provides the necessary upper support for the branches and vines of growing plants to expose them to maximum sunlight and air.

3 Claims, 5 Drawing Figures

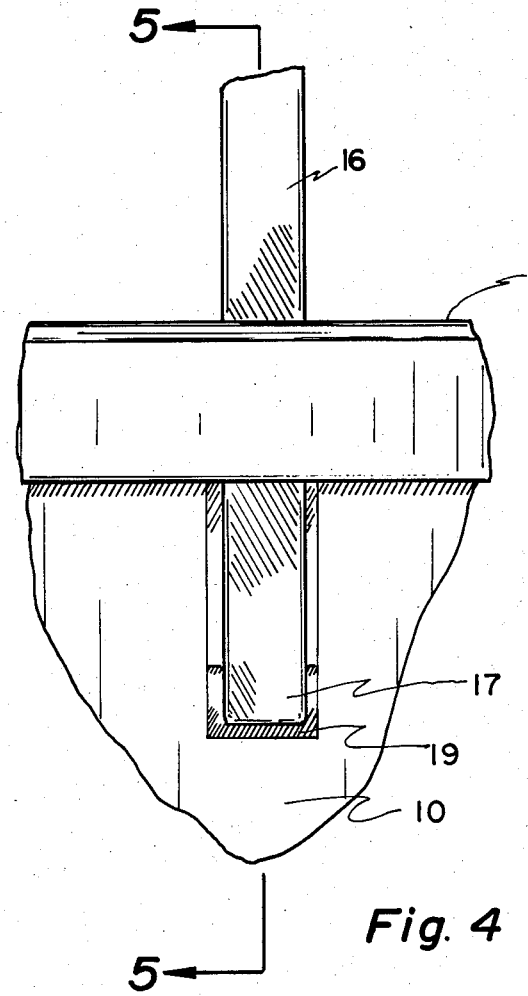
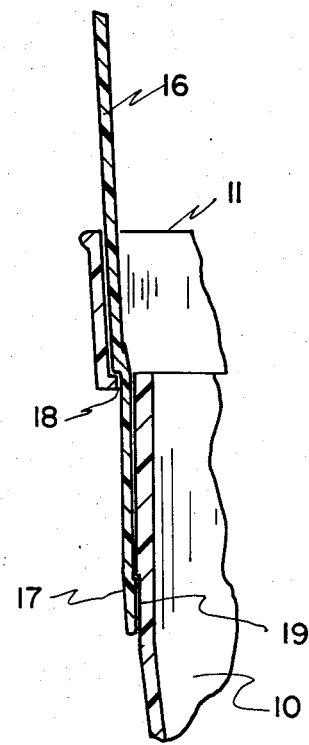
Fig. 4
Fig. 5

COMBINATION PLANT POT AND TRELLIS

BACKGROUND OF THE INVENTION

This invention relates to a portable plant pot having a detachable trellis means attached thereto to support growing plants.

One of the problems associated with growing plants, such as vegetables, flowers, or the like, in small, portable pots has been the lack of support means above the pot for support of vines, stocks or other parts of the plants as they grow above the top of the pot. Typically, these upper parts of the plants contain the valuable fruits, vegetables or flowers which must be nurtured and exposed to maximum sunlight to grow adequately. Without upper support means the weight of the growing stocks and vines soon causes them to bend and either break or hang downwardly where lack of sunlight and contact with undesirable surfaces stunts growth and produces substandard fruits, vegetables or flowers.

This problem has been particularly acute in situations where the pot has been used indoors or on a balcony or the like. When the pot is used on the earth, it has been possible to insert a mast or trellis into the earth next to the pot to provide the desirable support means above the pot. In some instances, such as disclosed in U.S. Pats. Nos. Des. 156,405 and Des. 156,406, devices have been used to provide a trellis for hanging on the wall and having a pot holder to accommodate the pot next to the trellis. This, of course, attempts to accomplish the same goal as the outdoor trellis stuck in the earth. However, both of these prior art trellis means, well and earth-inserted, require a stationary pot, and portability of the pot must be sacrificed entirely, particularly after the plant has begun to grow and become entwined in the trellis.

Other attempts to provide trellis means have included those disclosed in U.S. Pat. Nos. 3,962,503 and 4,270,310. However, these devices have also required either stationary support means, or at best a support a rod.

Accordingly, it is an objective of this invention to provide a combination pot and trellis means which is portable.

It is a further objective to provide a pot and detachable trellis for the pot.

It is an additional objective to provide a detachable trellis for a pot which extends all around the circumference of the pot.

These and other objectives are accomplished through the invention set forth below.

SUMMARY OF THE INVENTION

In accordance with the invention, a pot for plants, flowers, vines and the like has a trellis means detachably mounted along the top of the pot and extending upwardly therefrom. The trellis means extends preferentially circumferentially around the entire top of the pot. The trellis means also has rungs or steps extending circumferentially about the trellis to aid the climbing plants or vines in obtaining points of attachment to the trellis means.

THE DRAWING

A preferred embodiment of the invention is illustrated in the accompanying drawing, in which:

FIG. 1 is an elevational perspective view of the invention showing the trellis and pot separated but in alignment with each other;

FIG. 2, a bottom plan view of the combined pot and trellis;

FIG. 3, an elevational view of a part of the invention showing the trellis insert and the receiving port of the pot;

FIG. 4, an elevational view of the connection members shown in FIG. 3, but connected to each other; and FIG. 5, an elevational sectional view of the connecting members taken along line 5—5 of FIG. 4.

DETAILED DESCRIPTION OF THE ILLUSTRATED EMBODIMENT

Figure 1:
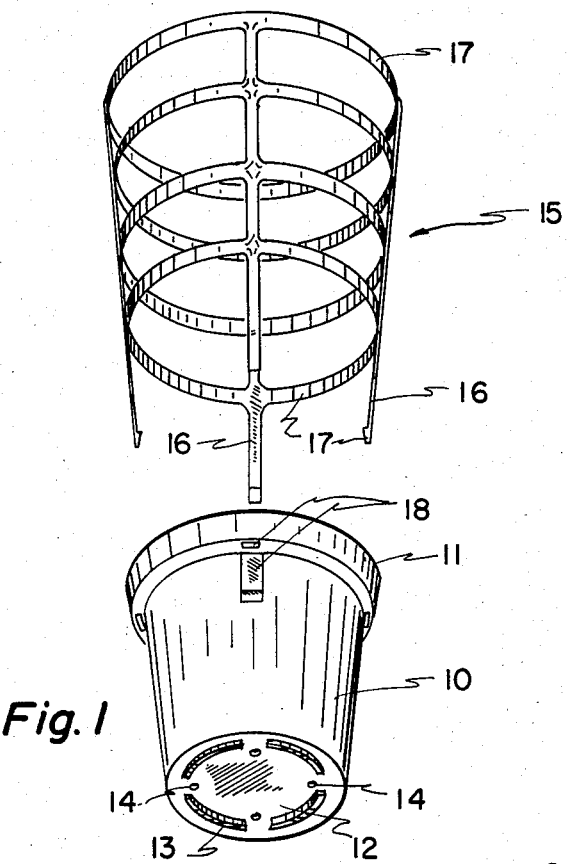
Figure 2:
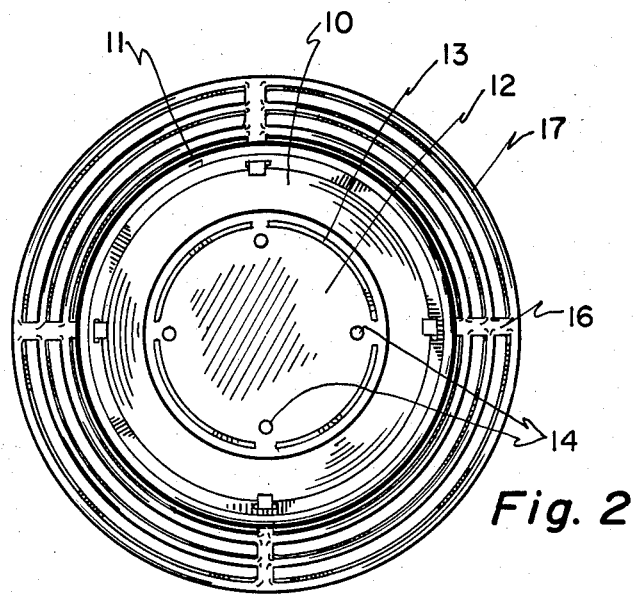

As illustrated in FIGS. 1 and 2, a plant pot 10 has an expanded rim 11 along the upper circumferential edge of pot 10. The bottom end 12 of pot 10 preferably has one or more circumferential ridges 13 adapted to hold the bottom 12 away from a surface (not shown) upon which the pot 10 normally rests. A plurality of apertures 14 serve as drains for pot 10 to permit water to drain from pot 10 and underneath the pot around ridges 14 to be disposed of elsewhere.

As shown in FIG. 1, a trellis means 15 is disposed above pot 10, and in this embodiment comprises a circumferential network of four support posts 16 interconnected by a plurality of circumferential rungs 17 or bands for aiding in the support of plant stocks and vines.

Figure 3:
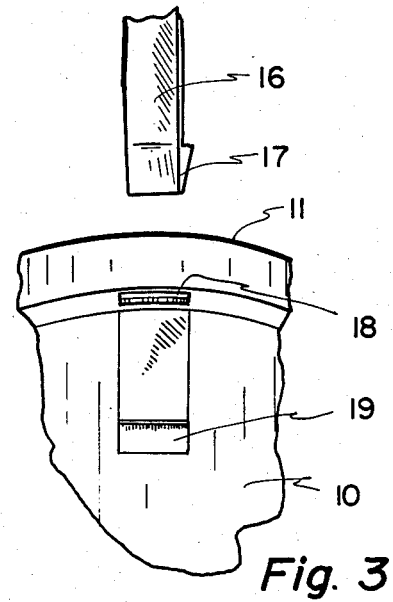

As shown in FIGS. 3, 4 and 5, a preferred means for attaching trellis means 15 to pot 10 includes horizontal lip means 17 on the bottom ends of each support post 16. Tip means 17 extend downwardly through aperture 8 in rim 11 to engage ledge means 19 on the side of pot 10 and secure posts 16, and hence trellis 15, firmly against the top of pot 10.

In a preferred embodiment shown in FIG. 5, a support ridge 20 on support post 16 is adapted to rest on the horizontal lower edge of rim 11 to provide additional vertical support to trellis means 15 when it is secured in place on pot 10.

Both pot 10 and trellis means 15 can be constructed of thermoplastic materials or other suitable materials, and can be molded or otherwise fabricated.

While this invention has been described with respect to a preferred embodiment, it is to be understood that there are other embodiments which fall within the scope of the invention which is limited only by the scope of the appended claims.

I claim:

1. Combination portable plant pot and trellis comprising in combination:

a circular plant pot having a laterally extending circumferential flange member disposed along the upper edge of the pot;

trellis means having at least one elongate support member extending downwardly from the lower edge thereof for detachably mounting along the circumferential member of the plant pot;

attachment means for attaching the trellis means to the plant pot comprising in combination:

said downwardly extending support member having a first ledge means extending outwardly therefrom and a second ledge means extending inwardly therefrom at a point on the member below said first ledge means;

said plant pot having a first outwardly extending cooperating lip means adjacent to an aperture in said circumferential member adapted to receive and hold the first ledge means when the trellis downwardly extending support member is inserted into the aperture in the circumferential member; and a second cooperating lip means disposed in the outer upwardly-extending side of the plant pot adapted to receive and hold the second ledge means of the trellis downwardly-extending support member.

2. Combination portable pot and trellis as set forth in claim 1, wherein said trellis means is circumferential around the upper end of said pot means and is attached thereto at a plurality of points.

3. Combination portable plant pot and trellis as set forth in claim 1, wherein said pot means has apertures and downwardly extending ridges in the bottom end of said pot means to accommodate drainage of water out of and away from said pot means.

* * * * *